United States Patent [19]

Yokoya et al.

[11] Patent Number: 4,592,540
[45] Date of Patent: Jun. 3, 1986

[54] DAMPING CAPACITY ADJUSTING MECHANISM FOR AN AIR SUSPENSION

[75] Inventors: Yuji Yokoya; Shuuichi Buma; Hitoshi Araki, all of Toyota, Japan

[73] Assignee: Toyota Jidosha Kabushiki Kaisha, Japan

[21] Appl. No.: 681,378

[22] Filed: Dec. 13, 1984

[30] Foreign Application Priority Data

Dec. 23, 1983 [JP] Japan .............................. 58-197198[U]

[51] Int. Cl.[4] ...................... B60G 13/00; B60G 15/00; F16F 9/00; F16F 11/00
[52] U.S. Cl. .................................... 267/8 R; 188/299; 280/708; 280/714; 267/35; 267/64.22; 267/64.24
[58] Field of Search ................. 188/299, 285, 286–287, 188/289, 298, 312, 314, 319; 267/64.15–64.28, 35, 22 R, 22 A, 8, 8 A, 34, 63 R, 122–123, 113, 8 B, 121; 280/714, 707, 668, 708, 711, 693, 712; 364/424, 426, 431.08, 432

[56] References Cited

U.S. PATENT DOCUMENTS

| 790,476 | 5/1905 | Borland | 267/64.22 |
|---|---|---|---|
| 3,246,905 | 4/1966 | Morgan | 280/708 X |
| 3,559,776 | 2/1971 | Schultze | 188/319 X |
| 4,004,762 | 1/1977 | Jenkins | 267/64.22 X |
| 4,206,934 | 6/1980 | McKee | 280/714 X |
| 4,313,529 | 2/1982 | Kato et al. | 188/299 |
| 4,468,739 | 8/1984 | Woods et al. | 280/707 X |
| 4,527,676 | 7/1985 | Emura et al. | 188/319 X |
| 4,534,580 | 8/1985 | Kobayashi et al. | 280/712 |

Primary Examiner—Douglas C. Butler
Attorney, Agent, or Firm—Kane, Dalsimer, Kane, Sullivan and Kurucz

[57] ABSTRACT

An air suspension comprises a shock absorber having a piston rod in which is disposed a control rod for adjusting a damping force, an air spring having a main air chamber and an auxiliary air chamber, a valve body for affording and shutting off communication between both air chambers to adjust the spring constant of the air spring, a support having a rigid member to which the piston rod is fixed and in which the valve body is disposed and connected to a car body and an actuator provided above the support to adjust at the same time the damping force of the shock absorber and the spring constant of the air spring. The actuator is provided with an electric motor, a gear fixed to the motor and a pair of rods arranged parallel to each other and extended toward the rigid member of the support, one rod being coupled with the control rod and the other being coupled with the valve body. The pair of rods are coupled respectively with a pair of tubes supported rotatably by a bracket through pins. A gear is fixed to each tube and at least one of two gears meshes with the gear of the motor.

10 Claims, 2 Drawing Figures

DAMPING CAPACITY ADJUSTING MECHANISM FOR AN AIR SUSPENSION

BACKGROUND OF THE INVENTION

1. Field of the Invention

This invention relates to an air suspension, and more particularly to a Macpherson strut type air suspension used for an automobile and having a novel damping capacity adjusting mechanism.

2. Description of the Prior Art

For a strut type air suspension is there one capable of adjusting the damping capacity thereof, that is, the damping force of a shock absorber and the spring constant of an air spring. In this type of suspension, the shock absorber has a damping force adjusting mechanism provided in association with a piston disposed slidably in a cylinder and is constituted such that the kinetic energy of liquid flowing through the piston is varied. On the other hand, the air spring is constituted such that a main air chamber formed by surrounding the shock absorber with a housing and a diaphragm and an auxiliary air chamber are filled with compressed air for affording and shutting off communication between the main and auxiliary air chambers with a valve.

In said type of suspension, wherein a structure for adjusting the damping force of the shock absorber and the spring constant of the air spring at the same time is employed, a single control rod was extended from an actuator into a piston rod of the shock absorber to adjust the damping force of the shock absorber on the one hand and the spring constant of the air spring on the other by this control rod.

SUMMARY OF THE INVENTION

Now, for adjusting the damping force of the shock absorber will suffice a slight rotational angle of the control rod to deflect an orifice provided in the control rod from a hole provided in the piston rod. On the other hand, to vary the spring constant of the air spring, a large rotational angle has to be given to the control rod for affording and shutting off communication between the main and auxiliary air chambers. Thus, a large rotational angle larger than originally necessary for adjusting the damping force of the shock absorber was given to the control rod so that a surplus work was given to the control rod, and thus a surplus load was given to the actuator unfavorably from a viewpoint of energy saving.

Accordingly, an object of the present invention is to provide an air suspension which can adjust individually the damping force of a shock absorber and the spring constant of an air spring with a single actuator.

The air suspension according to the present invention comprises a shock absorber having a piston rod in which a control rod for adjusting a damping force is disposed, an air spring including a main air chamber and an auxiliary air chamber and having the spring constant adjusted by affording and shutting off communication between said both air chambers with a valve body, a support connected to a car body including a rigid member with which said piston rod of said shock absorber is coupled and in which said valve body is disposed and an actuator provided above said support for operating said control rod and said valve body.

The other objects and features of the present invention will become apparent from the following description of a preferred embodiment of the invention with reference to the accompanying drawings.

DESCRIPTION OF THE PREFERRED EMBODIMENT

Figure 1:
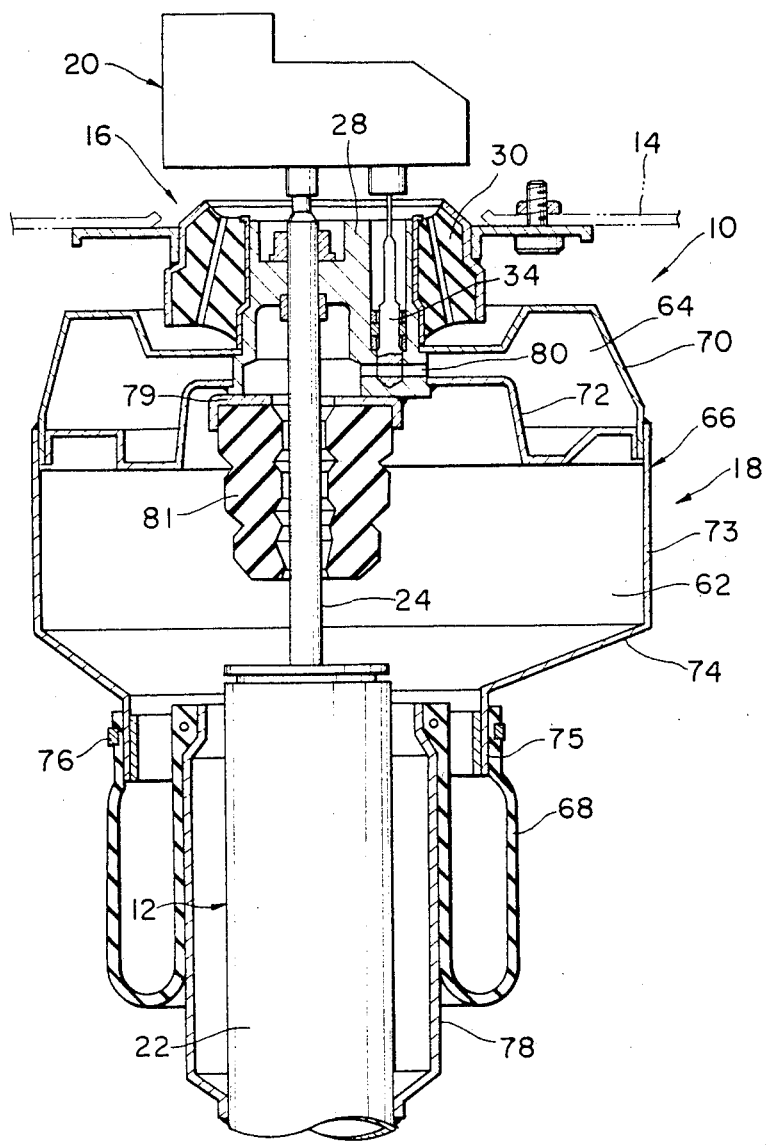
FIG. 1 is a sectional view showing an essential part of an air suspension according to the present invention.

As shown in FIG. 1, a suspension 10 comprises a shock absorber 12, a support 16 for connecting this shock absorber 12 to a car body 14, an air spring 18 and an actuator 20.

The shock absorber 12 is provided with a cylinder 22, a piston disposed movably in this cylinder 22 and a piston rod 24 connected to the piston to project from the cylinder 20 to the outside. The piston is provided with an orifice and other ports through which oil or other liquid received in the cylinder flows, when the piston rod 24 is extended and contracted, and a valve body for opening and closing the ports. The piston rod is provided with a hole for affording communication between liquid chambers defined above and below the piston. The shock absorber 12 has the lower end connected to a suspension arm. Since said constitution is not related directly to the present invention, it is not shown in the drawing. For the shock absorber 12 may be used a so-called mono tube type consisting of only a single cylinder in addition to a so-called twin tube type provided with the inside and outside cylinders.

Figure 2:
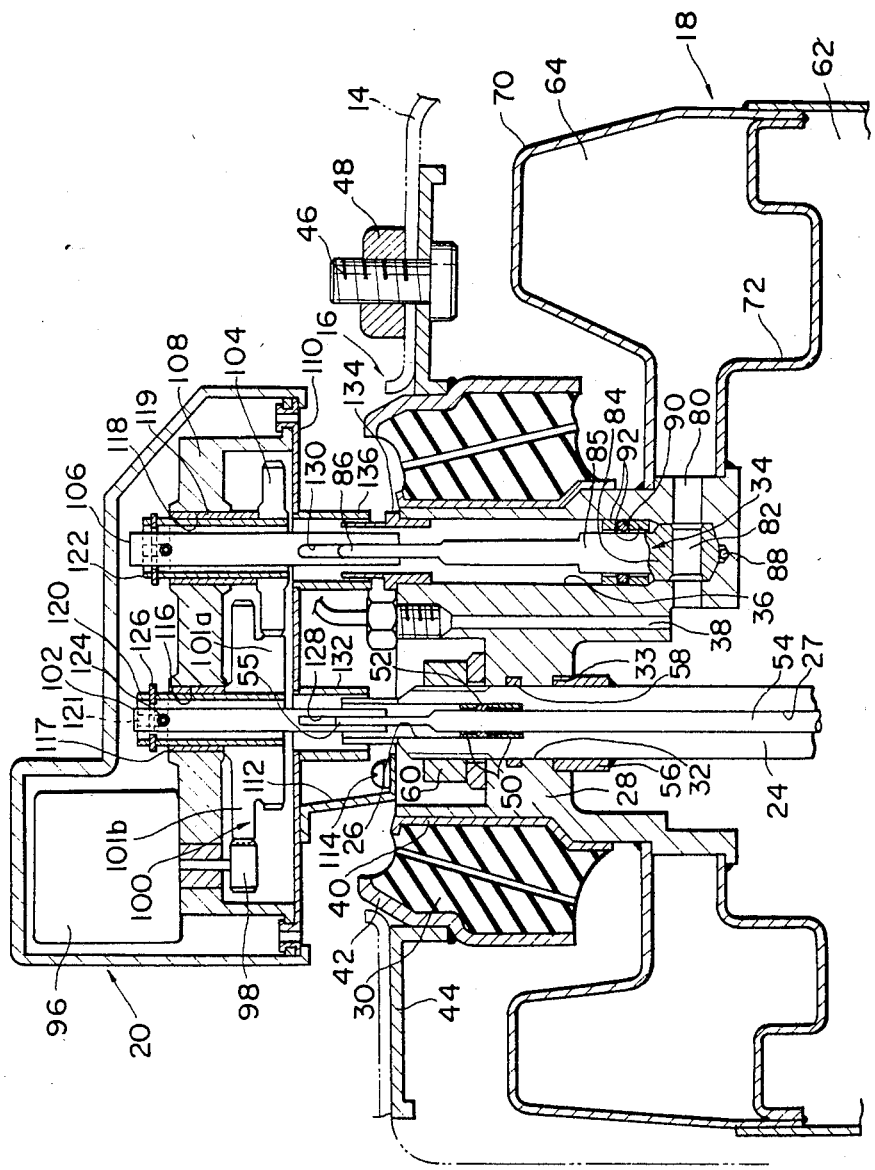
FIG. 2 is an enlarged sectional view showing an essential part of a damping capacity adjusting mechanism.

As shown in FIG. 2, the piston rod 24 has a longitudinal hole 26 provided axially from the upper end face and a longitudinal hole 27 connected to said hole 26 and having the reduced diameter.

The support 16 is provided with a rigid member 28 and a bushing 30 formed of rubber. The rigid member 28 is formed of high rigidity material such as steel having a circular section, and provided with a hole 32 through which the piston rod 24 extends, a hole 36 in which a valve body 34 is disposed and a hole 38 for introducing air to the air spring 18. The bushing 30 is vulcanized and bonded to an inside cylinder 40 and an outside cylinder 42, a support member 44 being welded to the outside cylinder 42. The rigid member 28 is press fitted onto the inside cylinder 40 and a nut 48 is screwed onto a bolt 46 extending through the support member 44 and car body 14 so that the support 16 is coupled with the car body 14.

A pair of collars 50 between which is interposed a sealing O-ring 52 is press fitted into the longitudinal hole 26 in the piston rod 24, and a control rod 54 disposed rotatably in the longitudinal hole 27 is kept under the liquid tight condition by the O-ring 52. The control rod 54 is provided on the lower end with an orifice (not shown) diametrally extending and capable of opposing to the hole of the piston rod for affording communication between liquid chambers defined above and below the piston of the shock absorber. An upper end of the control rod is formed as a flat portion 55.

A ring 56 is welded to the piston rod 24. A sealing O-ring 58 is held on the hole 32 in the rigid member 28 and the piston rod 24 is inserted into the hole 32, so that the ring 56 abuts against a shoulder 33 of the rigid member 28. A nut 60 is screwed onto the piston rod 24 to fix the piston rod 24 to the rigid member 28 and the piston rod 24 is kept airtight by the O-ring 58.

The air spring 18 is constituted from a main air chamber 62 and an auxiliary air chamber 64 filled with compressed air. As shown in FIG. 1, the main air chamber 62 is formed of a housing 66 in cooperation with a diaphragm 68. On the other hand, the auxiliary air chamber 64 is formed of the housing 66 in cooperation with an auxiliary housing 70.

The housing 66 has a plane annular ceiling portion 72 welded over the whole inner peripheral edge to the rigid member 28, a first cylindrical portion 73 and a second cylindrical portion 75 extending integrally from the cylindrical portion 73 through a converging tapered inclined portion 74. In the embodiment shown, the auxiliary housing 70 is disposed spaced above from the ceiling portion 72 of the housing 66 and welded over the whole inner peripheral edge to the rigid member 28. The outer peripheral edge of the ceiling portion 72 of the housing 66 is welded to the outer peripheral edge of the auxiliary housing 70 over the whole circumference, and the auxiliary housing 70 is welded to the first cylindrical portion 73 over the whole circumference so that the housing 66 is made integral with the auxiliary housing 70.

The diaphragm 68 is formed cylindrically of rubber. This diaphragm 68 is folded back at the approximately central portion, and the outside end thereof is sandwiched between the second cylindrical portion 75 of the housing 66 and the ring 76 and fixed to the housing 66 by caulking the ring 76. The inside end of the diaphragm 68 is fitted in a cylindrical air piston 78 welded to the cylinder 22.

A through hole 80 extending orthogonally to the hole 36 is provided below position of the hole 36 in the rigid member 28 in which the valve body 34 is disposed, and affords communication between the main and auxiliary air chambers 62,64. In the embodiment shown in FIG. 1, a holder 79 is welded to the underside of the rigid member 28 and a rubber bound stopper 81 is mounted on the holder 79. In this case, the main air chamber 62 communicate to the auxiliary air chamber 64 through the holes inside the holder 79 and the bound stopper 81 and the hole 80 in the rigid member 28.

The valve body 34 has integrally a slidable portion 84, a reduced diameter portion 85 and a flat portion 86, the slidable portion 84 being provided with a hole 82 extending diametrally to communicate to the through hole 80 in the rigid member 28. A ball 88 is disposed on the bottom of the hole 36 and the valve body 34 is inserted into the hole 36. A pair of collars 92 between which a sealing O-ring 90 is interposed are press fitted into the hole 36 and the valve body 34 is disposed rotatably in the hole 36 with the reduced diameter portion 85 being kept under the airtight condition by the O-ring 90. When this valve body 34 is rotated 90° for example, the main air chamber 62 is shut off from the auxiliary air chamber 64.

The actuator 20 is provided with a rotary means 96, a first gear 98, a second stepped gear 100, a first rod 102, a third gear 104 and a second rod 106. While the rotary means 96 is an electric motor in the embodiment shown, it may be otherwise a hydraulic motor, a combination of a rack and a pinion moved by a hydraulic cylinder or the like. This rotary means 96 is fixed to a base 108 which is fixed to an auxiliary base 110. A plurality of brackets 112 are welded to the auxiliary base 110 and mounted on the rigid member 28 by screws 114.

The base 108 is provided with two parallel holes 116,118 in positions opposed to two holes 32,36 in the rigid member 28, bushings 117,119 being press fitted into the holes 116,118 respectively. Tubes 120,122 are rotatably inserted into the bushings 117,119 respectively. The second gear 100 is fixed to the lower end of the tube 120 which is provided on the upper end with a pair of notches 121 at a circumferential interval of 180°. A pin 124 press fitted into the first rod 102 is disposed in the notch 121 and an E-ring 126 is mounted on the tube 120 to prevent the first rod 102 from slipping off upward. Also, the pin 124 in the first rod 102 contacts with the end face of the base 108 to prevent the tube 120 from the downward movement.

The tube 122 having the lower end fixed to the third gear 104 is connected to the second rod 106 in the same constitution as that of said tube 120 and the first rod 102. As a result, the first rod 102 and the second rod 106 are arranged parallel to each other to extend toward the rigid member 28 and the lower gear 101a of the second gear 100 meshes with the third gear 104. The upper gear 101b of the second gear 100 meshes with the first gear 98 connected directly to a shaft of the rotary machine 96. Thus, by selecting a proper number of teeth of each gear can be determined at will the rotational angle of the first and second rods 102,106.

The first and second rods 102,106 are provided with slits 128,130 respectively into which are inserted respectively the flat portion 55 of the control rod 54 and the flat portion 86 of the valve body 34. The connection between the first rod 102 and the control rod 54 is preferably covered with the end of the piston rod 24 and a cover 132 fixed to the auxiliary base 100 as shown in the drawing to prevent intrusion of dust. Similarly, the connection between the second rod 106 and the valve body 34 is preferably covered with a cover 134 inserted into the hole 36 and a cover 136 fixed to the auxiliary base 110.

Operation of Embodiment

When an automobile travels, the rotary means 96 of the actuator 20 is operated. On the one hand, the control rod 54 is rotated through the gears 98,101b, tube 120 and first rod 102 to adjust the damping force of the shock absorber, and on the other hand, the valve body 34 is rotated through gears 101a,104, tube 122 and second rod 106 to afford and shut off communication between the main and auxiliary air chambers 62,64 and adjust the spring constant of the air spring. Generally in this case of adjustment, the spring constant of the air spring is adapted to be hardened as the damping force of the shock absorber is increased, and softened as same is decreased. However, further adjustment may be necessarily possible according to the type of vehicle.

When the automobile travels and tires bound and rebound, the shock absorber 12 is swung to deform the bushing 30 of the support 16. However, since two rods 102,106 of the actuator 20 are located opposed to the rigid member of the support 16, both rods do not change their relative position so that the adjusting mechanism is not subjected to any troubles.

According to the present invention, not only the damping force of the shock absorber and the spring constant of the air spring can be adjusted by one and the same actuator, but also an optimum operational range of air suspension can be respectively set to the air suspension since the control rod for adjusting the damping force of the shock absorber and the valve body for adjusting the spring constant of the air spring are individually operated.

Also, the large rotational angle for adjusting the damping force of the shock absorber does not need to be given to the control rod, and the surplus work for the control rod can be eliminated to reduce the load on the actuator.

We claim:

1. A damping capacity adjusting mechanism for an air suspension used for an automobile comprising a shock absorber having a piston rod in which is disposed rotatably a control rod for adjusting a damping force; and an air spring having a main air chamber and an auxiliary air chamber, wherein said damping capacity adjusting mechanism comprises:
    a valve body for affording and shutting off communication between said both air chambers to adjust the spring constant of the air spring;
    a support having a rigid member to which said piston rod is connected and in which said valve body is disposed rotatably, and a rubber bushing disposed outside said rigid member and connected to a car body; and
    an actuator provided above said support to rotate said control rod and valve body.

2. An air suspension as claimed in claim 1, wherein said control rod and valve body are rotatable about their axes.

3. An air suspension as claimed in claim 2, wherein said actuator is fixed to said rigid member.

4. An air suspension as claimed in claim 1, wherein said support is provided with a rubber bushing disposed outside said rigid member.

5. A damping capacity adjusting mechanism for an air suspension including shock absorber having a piston rod in which is disposed rotatably a control rod for adjusting a damping force, and an air spring having a main air chamber and an auxiliary air chamber, wherein said damping capacity adjusting mechanism comprises:
    a valve body for affording and shutting off communication between said both air chambers to adjust the spring constant of the air spring;
    a support connected to a car body having a rigid member to which said piston rod is connected and in which said valve body is disposed rotatably; and
    an actuator provided above said support to rotate said control rod and valve body, wherein said actuator comprises a rotary means, a pair of rods disposed parallel to each other and extended toward said rigid member of said support, one rod being connected to said control rod and the other rod being connected to said valve body respectively, and a means for transmitting the turning force of said rotary means to said pair of rods.

6. An air suspension as claimed in claim 5, wherein said transmitting means is provided with a gear fixed to said rotary means and a pair of gears engaging said pair of rods respectively, at least one of the gears meshing with said gear fixed to said rotary means.

7. An air suspension as claimed in claim 5, wherein each of said rods is coupled with a tube supported rotatably by a bracket through a pin.

8. An air suspension as claimed in claim 5, wherein the connections between said pair of rods, control rod and valve body are respectively covered with covers.

9. An air suspension as claimed in claim 5, wherein said control rod and valve body are inserted respectively into slits provided in said pair of rods.

10. A damping capacity adjusting mechanism for an air suspension comprising a shock absorber having a piston rod in which a control rod is adjusting a damping force is disposed rotatably and an air spring having a main chamber and an auxiliary air chamber, wherein said damping capacity adjusting mechanism comprises:
    a valve body for affording and shutting off communication between said both air chambers to adjust the spring constant of the air spring;
    a support having a rigid member to which said piston rod is connected and in which said valve body is disposed rotatably and connected to a car body; and
    an actuator provided above said support to adjust the damping force of said shock absorber and the spring constant of the air spring at the same time, the actuator comprising a rotary means, a gear fixed to said rotary means, a pair of rods arranged parallel to each other and extended toward said rigid member of said support, one rod being connected to said control rod and the other being connected to said valve body, each of said rods of the actuator being connected to a tube supported rotatably by a racket through a pin and a pair of gears each of which is fixed to said tube and at least one of the meshes with said gear fixed to said rotary means.

* * * * *

UNITED STATES PATENT AND TRADEMARK OFFICE
CERTIFICATE OF CORRECTION

PATENT NO. : 4,592,540
DATED : June 3, 1986
INVENTOR(S) : Yuji Yokoya et al

It is certified that error appears in the above-identified patent and that said Letters Patent is hereby corrected as shown below:

Column 6, line 44, "racket" should be --bracket--.

Signed and Sealed this

Sixteenth Day of September 1986

[SEAL]

Attest:

DONALD J. QUIGG

Attesting Officer     Commissioner of Patents and Trademarks